United States Patent Office 2,884,389
Patented Apr. 28, 1959

2,884,389

METHOD OF PREPARING AN ADHESIVE WHICH COMPRISES REACTING GELATINIZED AND UNGELATINIZED STARCH, A PHENOLIC COMPOUND AND AN ALDEHYDE

John F. Corwin, Pittsburgh, and Francis Person, Butler, Pa., assignors to Koppers Company, Inc., a corporation of Delaware No Drawing. Application August 2, 1957
Serial No. 675,830

4 Claims. (Cl. 260—17.2)

This invention relates to starch base adhesives fortified with a small amount of a phenolic-aldehyde resin in which the resin is formed in situ. In a more specific aspect it relates to phenolic-aldehyde fortified starch adhesives having a pot-life many times greater than such starch adhesives prepared by prior methods.

Starch adhesives fortified with phenolic-aldehyde resins are known, for example, in U.S. Patent 2,626,934 to Kesler. Those which develop a satisfactory measure of water-resistance sufficient so that water-wetting does not lead to substantial or total loss of adhesion utilize from 2–10% by weight of the resin, starch basis. They have the disadvantage of a short pot-life, so that after preparation they rapidly increase to an unworkable viscosity within several hours. Consequently their use as adhesives is distinctly limited. Their short pot-life and high viscosity require specialized equipment, and their preparation and application within so short a period of usefulness is inconvenient and inefficient.

It has now been discovered that water-resistant adhesives of this type, for example resorcinol-formaldehyde resin-fortified starch adhesives having a useful pot-life of 8 to 24 hours and more can be obtained by preparing the resin in the presence of a starch to give adhesives containing 2–20% of the phenolic compound, as resin, by weight of starch used. Certain pre-mixes of ingredients and techniques for simplifying and facilitating the preparation of the adhesives have also been discovered and will be referred to hereinafter.

By "starch" is meant any starch, pasted and unpasted, such as chlorine oxidized or acid- or enzyme-converted starches, alone or with other conventional converted or dextrinized starches or dextrins, as well as unmodified or unconverted starches, hereinafter to be referred to as "a starch" or "the starch."

This invention is based on reacting a phenolic compound, e.g. resorcinol, and an aldehyde, e.g. formaldehyde, in an aqueous alkaline starch mixture at elevated temperature, the phenolic compound being present in an amount of from about 2 to 20% by weight of the starch and the aldehyde being present in a mol ratio to phenolic compound from about 1.25:1 to 2:1. Preferably, the pH is between about 8 to 11 and the phenolic compound is present at about 5 to 10% by weight of the starch.

While it is not desired that the concept be limited to a specific theory of invention, it is believed that the interaction of the ingredients results in a mixture of resins formed in situ, for example phenolic-aldehyde, starch-aldehyde, and phenolic-starch-aldehyde complexes. In the case of laminating adhesives, all of a starch is cooked to gelatinize it prior to application; while in the case of corrugated board adhesives, the starch is present partly in the raw or unpasted state, which is pasted at the glue line in the corrugating machine. Various known additives such as clay or other fillers may be added as desired. The time and temperature of the reaction are so controlled that the paste has adequate pot-life, i.e., does not gel or lose its adhesive character prematurely, i.e., 8 to 24 hours and longer. However, the extent of the reaction must be such that the resulting adhesive composition when dried forms an adhesive bond which ranges from water-resistant to waterproof, according to requirements.

As to the three basic reactants that are used (i.e. starch or dextrin, phenolic compound and aldehyde, which includes formaldehyde-yielding compounds and others hereinafter enumerated), in general any commercial kind of starch may be used. That is, all starches and dextrins may be employed which contain sufficient available hydroxyl groups so that reaction can occur between them and the other two reactants. The kind of starch or dextrin used for a particular adhesive will depend upon the nature and type of the adhesive desired. For example, if a low solids content adhesive is desired, a thick-boiling starch can be used. On the other hand, if a high solids content product is desired, dextrins can be used. Various mixtures of different types of starch and/or dextrin can be formulated by those skilled in the art to meet specific properties and requirements.

The starch or dextrin concentration in any particular adhesive formulation depends upon the specific formulation involved and the type of starch or dextrin used. For example, if a thick-boiling native starch is used and all of the starch present is pasted, a maximum of about 10% thereof is all that can be used. However, if some unpasted starch is added, as in the common practice in preparing corrugating adhesive, starch concentrations of 20% or more are possible. Dextrins can be used in concentrations up to about 25%.

While the useful adhesives of the invention can be prepared with quantities of phenolic compound ranging from 2 to 20%, as resin, by weight of starch, it is preferred to use from about 5 to 10% by weight, with about 10% giving the greatest water-resistance. Conversely, the greater the percentage of starch and/or dextrin used, the lower will be the water-resistance of the adhesive. If too great a percentage of starch is used, the water-resistance will be too low, whereas if a sufficiency of the other reactants is used, the adhesive will have a sufficiently high degree of insolubility. Therefore, it is necessary to formulate within the limits disclosed. In this connection it has been found that resorcinol when used in a range of from 2 to 10% by weight of the starch and/or dextrin is adequate.

With respect to the aldehyde concentration, it is more convenient and preferable to state this in the form of a ratio to the phenolic compound concentration. Thus, it has been found that a mol ratio of aldehyde to phenolic compound of greater than 1 to 1 is always required. For example, when using resorcinol and formaldehyde the preferred formaldehyde to resorcinol ratio (i.e. F:R) is approximately 2 to 1. In certain instances the mol ratio can be as low as 1.25 to 1. Higher formaldehyde to resorcinol ratios than 2 to 1 shorten the pot-life of the adhesives and are therefore less useful.

One effective technique for controlling the rate and degree of reaction in certain embodiments of the invention is to control the temperature used in pasting the starch component. This in turn controls the degree of dispersion of the starch or dextrin. Alkalinity also has a bearing on the degree of pasting of the starch or dextrin since, in general, increases in alkalinity tend to decrease the pasting temperature.

One embodiment of the invention is carried out as follows. An aqueous solution of a phenolic compound, for example resorcinol containing a dispersed starch is adjusted to a pH range of about 8–9, an aldehyde such as formaldehyde is added increment-wise to give an initial formaldehyde:resorcinol molar ratio (F:R) of about 0.8:1 to 1:1 and a final molar ratio of about 1.25:1–1.41:1, the final formaldehyde increment being reacted at a mixture pH adjusted to about 11, and the mixture is heated to gelatinize the starch, advantageously at about 90° C. for about 10–30 minutes, or at a time-temperature schedule sufficient to give an adhesive having conventionally acceptable flow properties. An initial F:R molar ratio of about 1:1 is generally preferable for corrugating board adhesives, while an initial F:R molar ratio of about 0.8:1–0.9:1 is generally preferable for laminating adhesives. It is also advantageous, particularly for corrugating board adhesives, to have a portion of the starch as desired, in the ungelatinized (raw) state, and to swell or cook the starch in the glue line when corrugated board is being formed.

A preferred procedure for practicing the invention is to mix the starch and/or dextrin and the resorcinol in water with sufficient alkali to give a slurry having a pH of about 9.5 to 10.5. Such a slurry mixture is heated to 140–165° F., at which temperature sufficient swelling or pasting of the starch occurs to give the desired viscosity to the paste. The temperature of the pasted starch mixture is then lowered to about 100–115° F. and the formaldehyde constituents and unpasted starch are added. Within about ½ to 1 hour an adhesive composition will be obtained which, when used for production of corrugated board, will give a water-resistant to waterproof bond on drying. The reaction in the adhesive composition continues beyond the ½ to 1 hour period and the viscosity of the adhesive slowly increases as further reaction takes place between the three constituents. The working life (i.e. pot-life) will usually be from 8 to 48 hours depending upon conditions used, such as the amount of resorcinol, the F/R ratio, concentration of the starch, kind of starch or dextrin, the alkalinity and temperatures used.

The phenolic compounds useful in preparing the novel composition of this invention are hydroxy aromatic compounds in general and include compounds such as resorcinol, pyrocatechol, pyrogallol, phloroglucinol, 3,5-xylenol, and metal-cresol.

The aldehydes found eminently suitable in preparing the present compositions include formaldehyde, paraformaldehyde, glyoxal, acetaldehyde, propionaldehyde, butyraldehyde and higher aldehydes as well as cyclic aldehydes such a furfural. Among the combinations of the foregoing aldehydes and phenolic compounds which give excellent results are resorcinol-formaldehyde, resorcinol-furfural, resorcinol-glyoxal, phloroglucinol-formaldehyde, m-cresol-formaldehyde, and resorcinol-furfural-formaldehyde. It will be obvious that other of the foregoing aldehydes may be substituted in whole or in part for the aldehydes of the listed combinations. Preferred results have been obtained with combinations comprising resorcinol and formaldehyde in the molar ratios specified previously.

The following examples disclose a number of practical embodiments of the invention. Parts and percentages are by weight unless otherwise noted.

EXAMPLE 1

A. Resorcinol, tech. _____ 15
   Water _____ 688
B. Starch, chlorine-oxidized _____ 300
   Clay _____ 27
C. Formaldehyde, 37%:
   Initial _____ 8.83
   Final _____ 6.62
D. NaOH, 30% aq. soln. to pH ca. 8, initial _____ 1.0
   and to
   pH ca. 10, final _____ 17.0

Mix A to solution, mix in B, add initial portion of C and initial portion of D with mixing, the pH then being 8.0. With continued agitation raise temperature to 140° F. and hold for 20 minutes. Add final portion of D, cool to 109° F. and add final portion of C with continued mixing for several minutes. Initial F/R molar ratio 0.8 to 1, final F/R ratio 1.4 to 1. Pot-life at 109° F. exceeds 48 hours. The initial heating step can be omitted to give an adhesive equal in adhesive value, but is retained where a smoother consistency is desired. Also the final caustic addition can be made before the 190° F. cook with equally advantageous results. A conventional starch adhesive made with proportions of reactants equivalent to the above, but substituting an equal weight of water-soluble pre-formed resorcinol-formaldehyde resin for their ingredients, other conditions being the same, has a pot-life at 109° F. of about 6 hours. While both the adhesives described and those of the art using pre-formed resorcinol resin give excellent adhesion and water-resistance, applicants' adhesives, in addition, have pot-lives much greater than those of the pre-formed resin-fortified starch adhesives.

Adhesion is advantageously tested on 1" x 6" strips of stock, a 40 lb. kraft, a 90 lb. domestic kraft and a 90 lb. Weathertex kraft paper sized with about 2% melamine-formaldehyde resin. The strips are double spread with adhesive using a 1" paint brush, laid up face to face and rolled with a metal roller to effect uniform contact of the plies. Specimens of each paper are prepared and matured for 24 hours in a 100% R.H. box at about 70° F. to develop maximum wet bond quality for laboratory testing. Test specimens are thereafter immersed in tap water at 77° F. for 24 hours and then tested wet for resistance to ply separation in terms of ply failure. All of the adhesives prepared in accordance with the invention give excellent results, i.e., the plies cannot be separated by lateral pressure applied by thumb and forefinger. At equal water-resistance, resorcinol-formaldehyde resin-fortified starch adhesives rapidly increase to an unworkable viscosity within 4–6 hours.

EXAMPLE 2

The procedure of Example 1 is repeated, except that the final F/R ratio is 1.3 to 1. An adhesive having excellent properties and a pot-life at 109° F. in excess of 48 hours is obtained. The same is true when a similar adhesive having a final F/R ratio of 1.25 to 1 is prepared, but below a final F/R ratio of 1.25 to 1, unsatisfactory water-resistance results.

EXAMPLE 3

A. Resorcinol, tech. _____ 9
   Water _____ 640
B. Starch _____ 300
   Clay _____ 27
C. Formaldehyde, 37%:
   Initial _____ 5.3
   Final _____ 3.96
D. NaOH, 30% aq.:
   Initial _____ 0.53
   Final _____ 10.2

The procedure of Example 1 is repeated, except that the amount of resorcinol is reduced to 3 parts per 100 parts of starch, the initial and final F/R ratios being 0.8 to 1 and 1.4 to 1, respectively. A water-resistant adhesive giving excellent results is obtained. Its pot-life at 109° F. exceeds 48 hours.

EXAMPLE 4

The procedure of Example 1 is repeated, substituting gelatinized starch for the starch there used. The paste obtained has a somewhat higher viscosity and equally satisfactory adhesive properties. Enzyme-converted starches are also substituted for the chlorine-oxidized starch with advantageous results.

EXAMPLE 5

The procedure of Example 1 is repeated, except that a higher initial pH, 9, is used by adding more of the NaOH first. The final pH, proportions and procedure are otherwise similar. The product obtained has a somewhat higher, but satisfactory, viscosity, and test laminations are excellent. Pot-life exceeds 48 hours at 109° F.

EXAMPLE 6

The procedure of Example 1 is repeated, substituting meta-cresol for the resorcinol there used. A water-resistant adhesive having satisfactory properties and a good pot-life is obtained.

EXAMPLE 7

| | |
|---|---|
| A. Resorcinol, tech. | 15 |
| Water | 688 |
| B. Starch | 300 |
| Clay | 27 |
| C. Formaldehyde, 37%: | |
| Initial | 8.83 |
| Final | 6.62 |
| D. Formic acid, 25% | 1.06 |
| E. NaOH, 30% aq. soln. | 19.8 |

Mix A to solution, mix in B, add initial portion of C, and D with mixing. With continued agitation, raise temperature to 140° F., hold 20 minutes, then heat to 190° F., add E and hold temperature at 190° F. for 10 minutes. The pH is then about 11. Cool to 109° F. and add final portion of C. A satisfactory, water-resistant adhesive is obtained having a pot-life at 109° F. in excess of 48 hours.

EXAMPLE 8

Example 7 is repeated, substituting furfural for the formaldehyde used therein. A satisfactory, water-resistant adhesive having a pot-life in excess of 8 hours at comparable temperature is obtained.

EXAMPLE 9

Carrier

| | |
|---|---|
| A. Water | 180 |
| Carrier starch (gelatinized corn starch) | 70 |
| B. NaOH, 10% aq. soln. | 100 |
| C. Water | 280 |

Slurry

| | |
|---|---|
| D. Water | 880 |
| Pearl starch | 280 |
| Resorcinol, tech. | 17.5 |
| Formaldehyde, 37% | 12.89 |
| E. NaOH, 30% aq. soln. | 1.1 |
| F. Formaldehyde, 37% | 3.86 |

Mix A to a slurry, gradually add B with mixing until smooth, add C with continued mixing until smooth. Separately mix D, add E, when pH is about 8, heat to about 122° F. and hold for 30 minutes, cool to 109° F. and hold. Mix carrier portion into slurry portion gradually, then add F with mixing. The corrugating board adhesive so obtained has a gelatinizing temperature of 179° F., a pH of about 11, and a viscosity of 25.2 secs. at 109° F., using a Stein-Hall cup. After application and heating in the corrugator and drying and aging in conventional manner, the corrugated board has excellent water-resistant properties.

EXAMPLE 10

A slurry is prepared of 60 parts of a white dextrin having a medium viscosity and a low solubility, 6 parts of resorcinol, and 160 parts of water. To the slurry is added 1.7 parts of a 25% sodium hydroxide solution to give a pH of 8.5. The slurry is heated for 10 minutes at a temperature of between 185 and 212° F. and then cooled to 100–115° F. The temperature is maintained between 100 and 115° F. and 3 parts of formaldehyde in 20 parts of water is added. Within a relatively short period of ½ to 1 hour's time the adhesive is suitable for preparing solid board laminations. A water-proof bond is obtained upon drying without additinal heating.

EXAMPLE 11

A slurry is prepared of 600 parts of water, 100 parts of pearl starch, and 45 parts of resorcinol. The pH is adjusted with sodium hydroxide to 10. The temperature of the mixture is raised to 145–160° F. for approximately 10 minutes during which time the starch is pasted. Approximately 400 parts of water is added to the pasted starch mixture and the entire mixture is then slowly mixed into a slurry of 500 parts of pearl starch containing 25 parts of paraformaldehyde in 1045 parts of water. The combined mixture is heated to 100–115° F. and within ½ to 1 hour there is obtained an adhesive particularly suitable as an adhesive for corrugated board but may be used as a laminating adhesive for solid board, either of which gives a waterproof bond.

EXAMPLE 12

Example 11 is repeated, substituting equal parts of a furfural-formaldehyde mixture in an amount equal to the weight of the formaldehyde alone of that example. A water-resistant adhesive having satisfactory properties is obtained.

EXAMPLE 13

One hundred parts of pregelatinized starch, 500 parts of pearl starch, and 45 parts of resorcinol are slurried with 2045 parts of water containing 9 parts of caustic soda at a temperature of 100–115° F. To the slurry mixture is added 25 parts of paraformaldehyde while maintaining the temperature at 100–115° F. In approximately ½ to 1 hour's time an adhesive composition is obtained which can be used in a corrugating board machine to give a waterproof bond.

EXAMPLE 14

Example 13 is repeated, substituting phloroglucinol for the resorcinol therein used. An adhesive having comparable properties is obtained.

EXAMPLE 15

70 parts of a thin-boiling, acid-modified, corn starch, such as is commonly used in making the carrier portion of a starch base corrugating adhesive, is slurried in 180 parts of water. 100 parts of a 10% sodium hydroxide solution is slowly added to the starch with good agitation to paste the starch. The resulting paste is diluted with 280 parts of water. In a separate container a second mixture is prepared of 280 parts of unmodified corn starch, 17.5 parts of resorcinol, 12.7 parts of 37% formaldehyde solution and 880 parts of water. Sufficient 30% sodium hydroxide is added to adjust the pH to 8. The second mixture is heated at 50° C. for 30 minutes and then cooled to 43° C. The paste is then added to the second mixture slowly over a 30 minute period. Then 3.86 parts of 37% formaldehyde is added to the combined mixture bringing the final mol ratio of formaldehyde to resorcinol to 1.3:1. After mixing for 30 minutes the adhesive was ready for use in corrugating. The adhesive had good viscosity and pot life and resulted in water-resistant corrugated board.

EXAMPLE 16

70 parts of unmodified corn starch is slurried in 180 parts of water and the slurry heated to 50° C. 100 parts of a 10% sodium hydroxide solution is slowly added to the heated slurry with mixing until smooth. The mixture is now heated to 74° C. resulting in pasting of the starch and thereafter 17.5 parts of resorcinol and 10.3 parts of 37% formaldehyde solution are added to the paste which is held at 74° C. for 20 minutes. The paste is then cooled to 43° C. In a separate container a slurry of 280 parts of unmodified corn starch in 180 parts of water is prepared. The pasted starch portion is slowly added to the starch slurry over a 30 minute period and mixed for 5 minutes more. 6.3 parts of 37% formaldehyde solution are added to the final mixture giving a final formaldehyde resorcinol ratio of 1.3:1. The resulting adhesive had good viscosity and pot life and yielded a water-resistant corrugated board.

In the commercial practice of the invention according to the foregoing examples it is frequently advantageous for the manufacturer of laminated board to purchase a dry mixture of starch and/or dextrin plus phenolic compound. If called for in the adhesive formulation one or more fillers can be present in this dry mixture such as clay, soybean hulls, unpasted starch, ground corncobs, corn hulls, or wood flour. In addition, the customer can purchase separately his necessary requirements of caustic soda or other alkali, and aldehyde. The customer can conveniently prepare his requirements of adhesive by simply slurrying the dry mixture into water, adding the required amount of alkali and heating this slurry so as to paste the starch. The mixture is then cooled to the proper temperature and the aldehyde added and the mixture allowed to stand for ½ to 1 hour until observation or simple tests show that it has the proper adhesiveness and is ready for use. It will be seen that the foregoing procedure is simple and that clear instructions can be prepared which can be readily followed by operators familiar with the preparation and use of ordinary starch adhesives.

The corrugated board manufacturer also can purchase a mixture which contains the proper amounts of starch and phenolic compound, which mixture is conveniently used in the preparation of the pasted carrier only. The corrugator can also purchase an aldehyde and alkali and the secondary starch. From these ingredients the corrugator can readily prepare a corrugated board adhesive using the procedure set forth in Example 11 above. An even simpler formulation for certain corrugators is the one illustrated in Example 13 above. Here the corrugator buys a mixture of pregelatinized starch, resorcinol and unpasted starch. He slurries such a mixture in water, heats it to a temperature of 100–115° F. and adds the proper amounts of alkali and formaldehyde. After setting a short time, the adhesive is ready for use.

In another embodiment all of the starch is slurried in water and then sufficient alkali is added to produce an incipient pasting. The starch is allowed to swell, without becoming completely gelatinized, until the viscosity of the slurry reaches a desired level. The amount of alkali used is carefully controlled. When the starch swells sufficiently to give the desired viscosity, the phenolic compound is added so as to arrest the swelling action. At this point all of the starch is sufficiently reactive so that when aldehyde is added, reaction between starch, phenolic compound, and aldehyde occurs and a water-resistant to waterproof adhesive is obtained. The aldehyde is added about ½ to 1 hour before the adhesive is to be used, during which time the mixture ripens and becomes ready for use either as a solid board laminating adhesive or as a corrugated board adhesive.

The foregoing procedure offers these five preliminary advantages:

To illustrate the case of resorcinol and formaldehyde, first, the adhesive gives a satisfactory water-resistant bond for certain applications with as little as 2% resorcinol (based on the weight of the starch). Second, only one lot of starch is used. Third, no heating is required since the normal operating temperature (e.g. 100–110° F.) in pasteboard factories is sufficient. Fourth, all of the starch is swelled and available for reaction. Fifth, a high solids paste can be obtained (e.g. up to 25% dry substance) by using thick-boiling starches instead of having to use dextrins.

The alkali requirements for proper swelling of the starch are dependent primarily upon temperature, time and alkali concentration. The temperature at which the treatment is carried out is fairly critical for any particular set of conditions. For example, the normal operating temperature in pasteboard factories is in the range of 100–110° F. At this temperature range, the preferred concentration of caustic soda required to swell the starch varies between 0.8 and 0.95% based on the weight of the water only. In this temperature range, lower concentrations of the caustic soda will not swell the starch rapidly enough and higher concentrations will completely paste it in a matter of minutes or so. Even within the temperature range of 100–110° F. a few degrees change in temperature will markedly change the time required for the swelling action. In general, lower concentrations of caustic soda and lower temperatures will require longer swelling times and, conversely, higher caustic concentrations and higher temperatures require shorter swelling time. If a low concentration of caustic soda is used and a time of over an hour is required to get substantial swelling then a 28–30 second viscosity on a Bauer funnel is all that is necessary in the way of a swelling treatment. If a higher concentration of caustic soda is used so that the swelling occurs in 5–15 minutes, then a 70–85 second viscosity on a Bauer funnel gives better results. In either case when the resorcinol is added, the viscosity of the paste drops to about 20 seconds which is optimum for the use of the adhesive.

The following examples will serve to illustrate this particular embodiment of the invention.

EXAMPLE 17

An alkaline solution comprising 5 parts of caustic soda in 50 parts of water is gradually added to an agitated slurry of 180 parts of starch and 550 parts of water at a temperature of 110° F. The viscosity after approximately 4 hours is 28 seconds as measured on the Bauer funnel and 9 parts of resorcinol is then added, followed by 5 parts of formaldehyde. After aging for one hour the adhesive is suitable for use at a viscosity of 20 seconds.

EXAMPLE 18

Example 17 is repeated, substituting 3,5-xylenol for resorcinol. After ripening for approximately 1 hour an adhesive having the desired properties is obtained ready for use.

While certain combinations of phenolic compounds and aldehydes are illustrated in the several examples, it will be obvious to those skilled in the art that other phenolic compounds and aldehydes, of the classes enumerated, can be substituted to advantage without departing from the spirit and scope of the invention, and all matter described above is intended to be interpreted as illustrative and not in a limiting sense.

The in situ interaction of the phenolic compound, e.g. resorcinol, the aldehyde, e.g. formaldehyde, and the starch is accelerated at higher temperatures. While the interaction will proceed at room temperature, usually an elevated temperature, e.g. 100° F. is preferred in order to reduce the time required.

This application is a continuation-in-part of application Serial No. 451,711, filed August 23, 1954, now abandoned, and application Serial No. 569,260, filed March 5, 1956, now abandoned.

We claim:
1. The method of preparing paperboard adhesives of satisfactory pot-life which on curing form bonds ranging from water-resistant to waterproof which comprises preparing an aqueous mixture having a pH of about 8 to about 11 and containing a starch of which at least a portion is gelatinized, interacting said starch, a phenolic compound selected from the group consisting of resorcinol, metacresol, phloroglucinal, pyrocatechol, pyrogallol, and 3,5-xylenol and an aldehyde selected from the group consisting of glyoxal, paraformaldehyde, formaldehyde, acetaldehyde, propionaldehyde, butyraldehyde and furfural by maintaining the final reaction mixture at a temperature of about 100° F. to 115° F. for about 30 to 60 minutes, said phenolic compound being present in an amount between about 2 to 20% by weight of the starch, and said aldehyde being present in the mol ratio of aldehyde to phenolic compound of at least about 1.25:1.

2. The method of claim 1 in which the selected phenolic compound is resorcinol and the selected aldehyde is formaldehyde.

3. The method of preparing paperboard adhesives of satisfactory pot-life which on curing form bonds ranging from water-resistant to waterproof which comprises gelatinizing a starch by heating said starch to a temperature of at least about 140° F. in aqueous medium having a pH between about 8 and 11 for at least about 10 minutes; interacting a mixture consisting of (1) starch including such gelatinized starch, (2) from 2 to 20%, by weight of the starch, of a phenolic compound selected from the group consisting of resorcinol, metacresol, phloroglucinol, pyrocatechol, pyrogallol, and 3,5-xylenol, and (3) an aldehyde selected from the group consisting of glyoxal, paraformaldehyde, formaldehyde, acetaldehyde, propionaldehyde, butyraldehyde and furfural, the mol ratio of aldehyde to phenolic compound being from about 1.25:1 to about 2:1 by holding said mixture at a temperature of about 100 to 115° F. for about 30 to 60 minutes, to obtain an adhesive composition which produces at least a water-resistant adhesive bond when cured.

4. The method of claim 3 wherein the selected phenolic compound is resorcinol and the selected aldehyde is formaldehyde.

References Cited in the file of this patent

UNITED STATES PATENTS

| | | |
|---|---|---|
| 2,626,934 | Kesler | Jan. 27, 1953 |
| 2,650,205 | Kesler et al. | Aug. 25, 1953 |

UNITED STATES PATENT OFFICE
CERTIFICATE OF CORRECTION

Patent No. 2,884,389                                                    April 28, 1959

John F. Corwin et al.

It is hereby certified that error appears in the printed specification of the above numbered patent requiring correction and that the said Letters Patent should read as corrected below.

Column 3, line 3, for "1.41:1" read -- 1.4:1 --; line 41, for "metal-cresol" read -- meta-cresol --; column 4, line 22, for "kraft", each occurrence, read -- Kraft --; line 23, for "kraft" read -- Kraft --; column 10, line 9, after "fural," insert -- and mixtures thereof, --.

Signed and sealed this 29th day of September 1959.

(SEAL)
Attest:

KARL H. AXLINE                                                ROBERT C. WATSON
Attesting Officer                                           Commissioner of Patents